United States Patent
Liu et al.

(10) Patent No.: US 6,433,305 B1
(45) Date of Patent: Aug. 13, 2002

(54) METHOD AND APPARATUS FOR DRILLING HOLES WITH SUB-WAVELENGTH PITCH WITH LASER

(75) Inventors: Xinbing Liu, Acton, MA (US); Ming Li, Storrs, CT (US)

(73) Assignee: Matsushita Electric Industries Co., Ltd., Osaka (JP)

( * ) Notice: Subject to any disclaimer, the term of this patent is extended or adjusted under 35 U.S.C. 154(b) by 38 days.

(21) Appl. No.: 09/747,682

(22) Filed: Dec. 26, 2000

Related U.S. Application Data

(60) Provisional application No. 60/171,894, filed on Dec. 23, 1999.

(51) Int. Cl.[7] ............................................. B23K 26/02
(52) U.S. Cl. ............................. 219/121.71; 219/121.69
(58) Field of Search ....................... 219/121.71, 121.69, 219/121.6, 121.61, 121.67, 121.68, 121.7, 121.78; 372/25

(56) References Cited

U.S. PATENT DOCUMENTS

| | | | |
|---|---|---|---|
| 5,037,183 A | | 8/1991 | Gagosz et al. |
| 5,280,491 A | * | 1/1994 | Lai |
| 5,409,408 A | * | 4/1995 | Ellingson et al. |
| 5,451,785 A | * | 9/1995 | Faris |
| 5,656,186 A | * | 8/1997 | Mourou et al. |
| 5,747,769 A | | 5/1998 | Rockstroh et al. |
| 5,841,102 A | | 11/1998 | Noddin |
| 5,916,462 A | | 6/1999 | James et al. |
| 6,172,331 B1 | * | 1/2001 | Chen |

* cited by examiner

*Primary Examiner*—Tom Dunn
*Assistant Examiner*—Jonathan Johnson
(74) *Attorney, Agent, or Firm*—Ratner & Prestia

(57) ABSTRACT

A method of laser machining using an ultra-fast pulse laser is presented. According to the present invention a plurality of holes with a pitch less than the wavelength of the laser are drilled into a material sample. Reliable and reproducible hole drilling is accomplished through an exemplary drilling sequence which applies a number of pulses at a first pulse energy to the surface spaced to avoid laser hardening of the surface for adjacent holes of a first set of holes. Next, the number of pulses is increased or the energy of the laser beam is increased to drill holes that are interstitial to the first set of holes. The exemplary laser machining process may used to produce both one-dimensional and two-dimensional photonic crystals, among other applications.

14 Claims, 3 Drawing Sheets

METHOD AND APPARATUS FOR DRILLING HOLES WITH SUB-WAVELENGTH PITCH WITH LASER

This Application claims benifit of Provisional Application Ser. No. 60/171,894 filed Dec. 23, 1999.

BACKGROUND OF THE INVENTION

Many emerging material processing applications in the semiconductor and communications fields require sub-micron processing capability. A number of competing technologies exist that either have, or will soon have, this capability, such as; electron beam etching, plasma: etching, x-ray lithography, and machining with ultrafast pulse lasers (laser machining). Of these technologies, only laser machining provides the advantages of operation in a standard atmosphere and in situ monitoring.

An important feature of ultrafast pulse lasers is their capability to ablate surface regions smaller than their minimum, diffraction limited, spot size. This capability is created by the brevity of the pulse, which allows for essentially no spreading of heat during the pulse, and the Gaussian spatial beam profile. By carefully controlling the energy of a pulse, it is possible to raise the intensity of only a small region in the center of the beam above the ablation threshold for the material being machined. Because of the lack of heat conduction in the pulse duration, only the small region is ablated. In this way, holes may even be laser machined with diameters less than the wavelength of the laser, for example holes having a diameter of approximately 500 nm may be drilled using a 775 nm femtosecond pulse laser. Geometrically speaking, it is possible to space these holes as close as 500 nm. When the holes are drilled one by one from one end to the other with the same laser, however, the previous method of laser machining a series of holes, the hole center-to-center spacing (pitch) cannot approach this limit.

The following example illustrates this problem. Assume that the first hole is drilled with certain laser intensity and a certain number of laser pulses. The laser intensity is chosen so that laser-induced ablation occurs only in the central portion of beam spot formed on the surface, where the breakdown threshold is reached. This ablation leads to hole drilling. Even though the surrounding area that is irradiated does not reach ablation threshold, however, it may undergo material property changes that increase the ablation threshold for subsequent laser irradiation. This phenomenon of laser irradiation-induced material hardening, laser hardening hereinafter, means that using the same laser intensity and number of pulses on the hardened area, a new hole may not be drilled in the laser hardened region. Therefore the hole-drilling reliability and reproducibility suffers. This issue is of particular importance in a device, such as a photonic crystal, in which a large number of substantially identical holes placed with a precise sub-micron pitch are desired.

SUMMARY OF THE INVENTION

A solution to this problem is an exemplary laser machining process of the present invention, which allows closer placement of the holes to reach sub-wavelength center-to-center hole spacing (pitch).

The first step of this exemplary process is to separate the hole positions on the surface of the material sample into two groups selected so that no two members of either group have a pitch less than the laser beam spot size. Next the pulse energy of the laser beam is set to a predetermined level, selected to drill holes of the desired diameter in the surface. Then the sample is positioned so as to focus the laser beam on the is surface at a hole position in the first group and a number of laser pulses are applied to ablate the surface, thereby forming a hole in the surface. The process is repeated for every hole position of the first group.

At this point the pulse energy of the laser beam is set to a second predetermined level, selected to drill holes of the desired diameter in the surface once it has been laser hardened. Then the sample is positioned so as to focus the laser beam on the surface at a hole position in the second group and a number of pulses of the laser beam are applied to ablate the surface, thereby forming a hole in the surface. Alternatively, the pulse energy of the beam may be maintained at the same level and a greater number of pulses applied to the laser hardened surface. The process is repeated for every hole position of the second group.

Alternatively, the laser beam may be moved rather than the sample.

Another aspect of the present invention is an exemplary photonic crystal comprising a plurality of holes formed in a material sample by the method described above.

DETAILED DESCRIPTION OF THE INVENTION

Figure 1A:
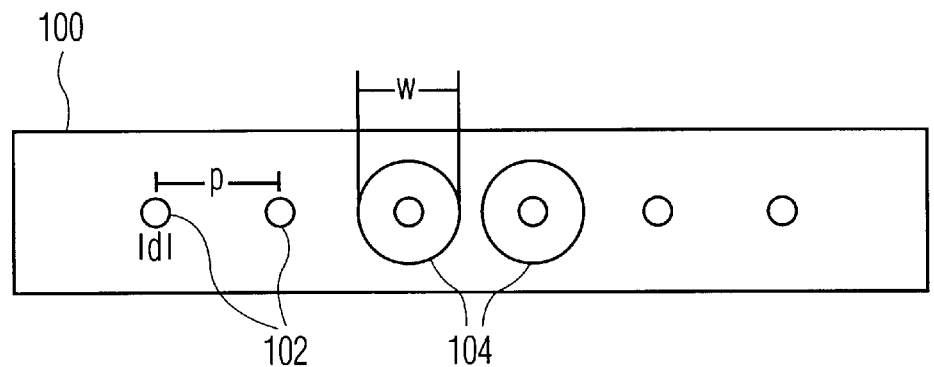
FIG. 1A is a top view drawing illustrating widely spaced holes and an associated laser hardened region on a section of laser machined sample.

This invention describes a method used in laser material processing applications for drilling small holes, having substantially uniform size and shape which holes have a diameter that is less than the wavelength of the laser beam. Currently, many laser material processing applications such as the machining of photonic band gap crystals using femtosecond laser pulses require sub-micron processing capability. FIG. 1A shows a row of widely separated holes 102, which have been laser machined into a material sample 100. These holes may be formed to have a diameter, d, less than the wavelength of the ultra-fast laser used to drill the holes. For example, if the laser used is a 775 nm femtosecond laser, the holes in FIG. 1 may have a 500 nm diameter with a pitch, p, of 2 $\mu$m. Geometrically speaking, it is possible to space these holes as close as 500 nm. However, when the holes are laser machined, the laser hardened regions 104 are also formed along the surface of the sample with a diameter equal to the beam width, w. In the example, w is 1.5 $\mu$m. Because the material properties in the laser hardened regions may be significantly different from those in the unhardened portions of the surface, a hole drilled at least partially within the laser hardened regions of the surface may have very different characteristics than one drilled in an unhardened portion.

Figure 1B:
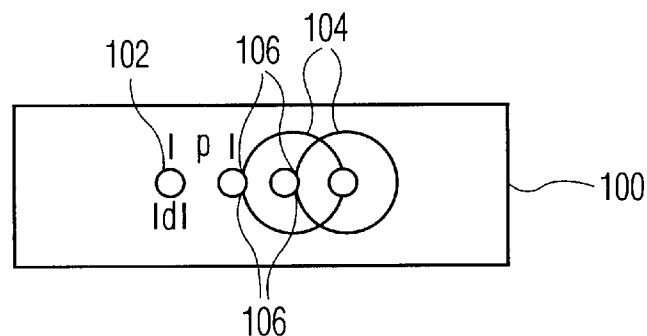
FIG. 1B is a top view drawing illustrating closely spaced holes and an associated laser hardened region on a section of laser machined sample.

FIG. 1B illustrates an exemplary material sample in which laser machined holes are closely spaced such that, if the holes are drilled one after another down the line, then each hole, after the first, has part of its area, near intersections 106, formed in a laser hardened region of the surface. Using the same exemplary laser beam parameters as above with reference to FIG. 1A, the pitch, p, in FIG. 1B is 750 nm.

Holes formed in this manner may be incomplete or deformed, which is undesirable, particularly in applications, such as photonic crystals, where precise tolerances are desired. Because the minimum diameter of the laser hardened region is determined by the diffraction limited beam spot size of the laser, laser machining substantially identical holes with a sub-wavelength pitch using a sequential drilling pattern may not be possible in many materials.

Figure 2:
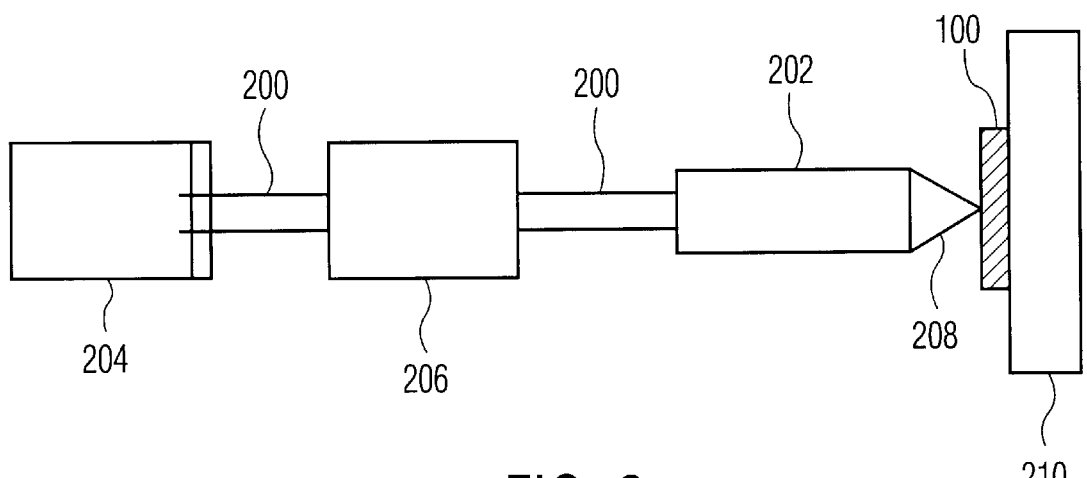
FIG. 2 is a block diagram illustrating an exemplary laser machining apparatus of the present invention.

FIG. 2 illustrates an exemplary embodiment of a laser machining apparatus used in the present invention. The ultra-short pulse laser 204, for example a 775 nm femtosecond laser, generates a laser beam 200, which desirably oscillates on a $TEM_{0,0}$ mode. The laser beam may be propagated between the components of the laser machining apparatus through the intervening air or along an optical fiber (not shown). After leaving the laser, the beam passes through a variable intensity attenuator and shutter assembly 206, which contains a shutter (not shown) and a variable intensity attenuator (not shown). The shutter controls the number of pulses and the variable intensity attenuator controls the pulse energy of the beam. A half-wave plate and crossed polarizers may form an exemplary variable intensity attenuator. With this combination, it is possible to select a desired laser intensity and number of pulses to be applied. An exemplary embodiment of the invention uses an ultra-short pulse laser having a wavelength of 775 nm. With the variable intensity attenuator, the pulse energy of the laser may be set between 1 nanojoule and 1 microjoule.

The laser beam is then focused onto the surface of the sample 100 to be machined. An output coupler 202, such as a long-working-distance, high numerical aperture microscope objective, may be employed to focus the beam 200 onto the work piece 100. The sample 100 may be attached to a precise XYZ-translation-stage 210 with nanometer resolution. By moving the XYZ stage 210 relative to the optical coupler 202, one may precisely focus the laser beam to any spot on the sample, as illustrated by the focused laser beam 208 in FIG. 2.

Figure 5:
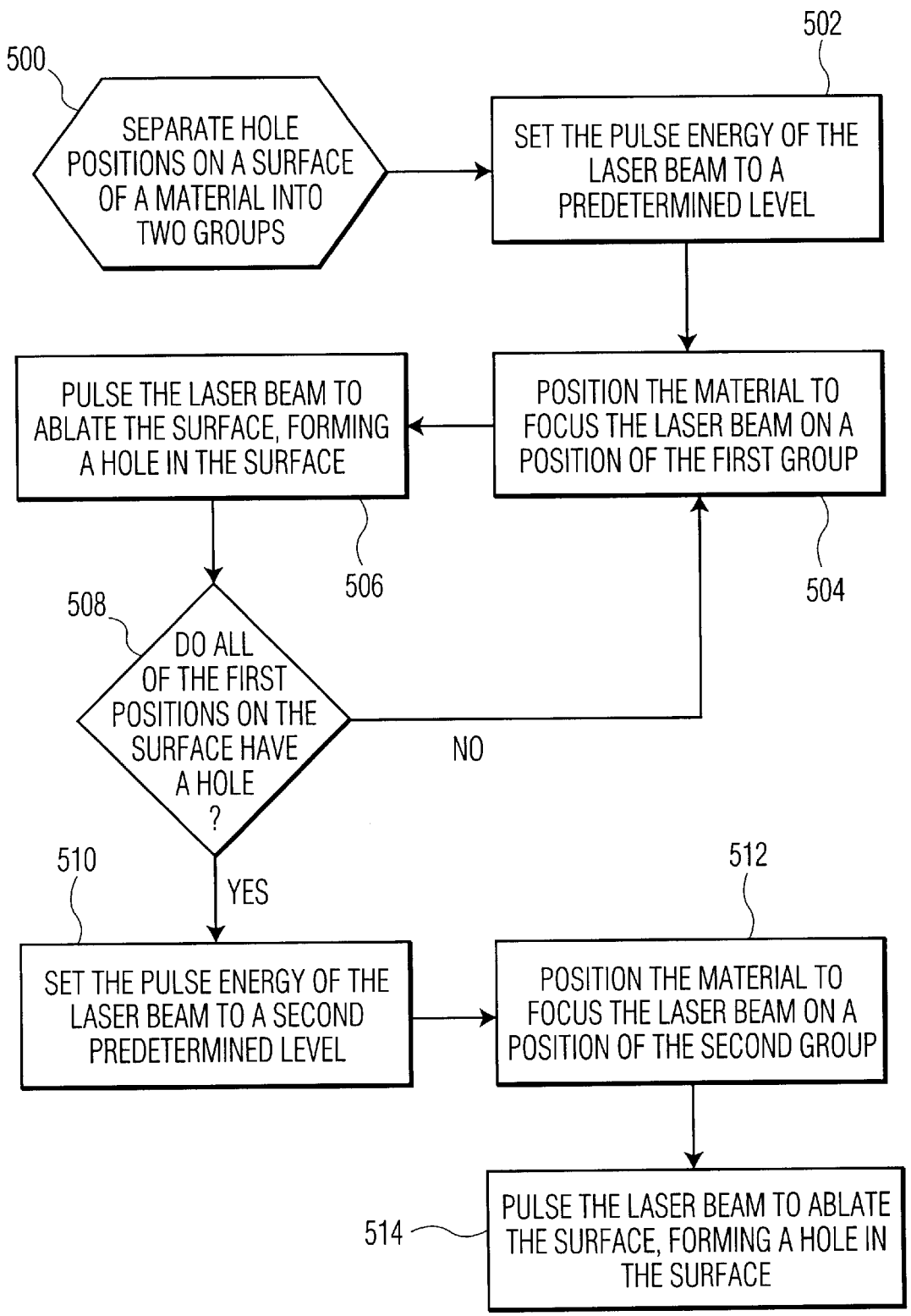
FIG. 5 is a flowchart diagram showing an exemplary laser machining method of the present invention.

An exemplary method of the present invention, charted in FIG. 5, is a procedure for drilling holes with sub-wavelength separations employing a laser machining apparatus of the sort illustrated in FIG. 2. This is accomplished using a new drilling pattern.

The first step, 500, is to separate the positions on material sample 100 where holes are to be drilled into two groups. These groups should be chosen so that no two holes in a given group are close enough to each other that the laser hardened region formed during the machining of one hole will overlap part of the other hole. Mathematically this means that the separation between any two holes in the same group is at least equal to the width of a laser hardened region. For a line of holes the groups may usually be selected by numbering the holes sequentially with the even numbered holes being one group and the odd-numbered hole being the other. It is contemplated that, if the holes of one group are still too close together after separating the holes into two groups, then three group may be created.

At the next step 502, the pulse energy of the laser beam is set to a level that provides a laser beam intensity within the central area of focused spatial profile of the laser beam which is above the ablation threshold of the unhardened material. The area of the laser beam profile in which the intensity exceeds the ablation threshold is desirably the same as the area of one of the holes to be machined.

Next, in the exemplary embodiment shown in FIG. 5, the sample is positioned such that the laser beam is focused on one of the first group of hole positions on the surface of the sample, step 504. The sample is precisely position in the X and Y directions to properly position the hole on the surface, and in the Z direction to focus the laser beam on the surface. It is contemplated that the long working length microscope objective 202 may be manipulated to focus and/or position the laser beam instead. It may be desirable for the laser beam to be propagated between components of the laser machining apparatus within an optical fiber in the case when the microscope objective is moved to position the laser beam.

A predetermined number of pulses are applied to ablate the surface 506. The number may be calculated to introduce a desired hole-size on non-hardened area. Alternatively the hole drilling process may be monitored in situ to ascertain when an appropriate number of pulses have passed. In this way, very high accuracy in hole depth may be attained.

The decision at step 508 causes the previous two steps, 504 and 506, to be repeated until all of the holes in the first group have been drilled.

Once all of the first positions on the surface have a hole, the process moves to step 510. The pulse energy of the laser beam is set to a second level that provides a laser beam intensity above the ablation threshold of the laser hardened material. The area of the laser beam profile in which the intensity exceeds the ablation threshold is desirably the same as the area of one of the holes to be machined.

Next, the sample is positioned such that the laser beam is focused on one of the second group of hole positions on the surface of the sample, step 512. The sample is positioned as in step 504.

The a number of pulses of laser beam are then applied to ablate the surface 514. The number may be calculated to introduce a desired hole-size on the laser hardened area or alternatively it may be monitored as previously described with regard to step 506.

These last two steps, 512 and 514, may be repeated until all of the holes of the second group have been drilled. If there is a third group of hole positions, the pulse energy may be increased again to account for the material being twice-exposed to the laser beam and the third group of holes drilled in a manner similar to the first two groups.

Figure 3:
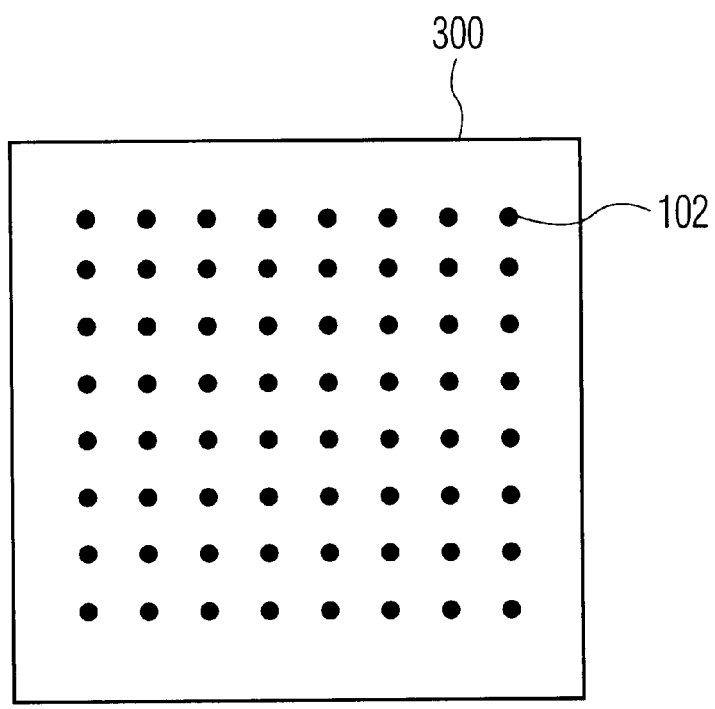
FIG. 3 is a top view drawing illustrating an exemplary photonic crystal formed by an exemplary laser machining method of the present invention.

This method is applicable to any laser machining process where laser hardening of the surrounding areas may be present and may prevent reliable drilling results when employing prior drilling sequences. An exemplary implementation of the present invention, illustrated in FIG. 3, involves drilling holes 102, with femtosecond pulses, in substrate 300 to fabricate a photonic crystal. This substrate may be desirably formed of a dielectric material or a multi-layer structure, such as a silicon-on-silicon dioxide structure. The exemplary photonic crystal illustrated in FIG. 3 has been formed as a two-dimensional photonic crystal structure with the holes arranged in a square pattern. The square pattern is only one possible pattern for a two-dimensional photonic crystal. Other patterns, such as a hexagonal pattern, may also be formed using the present laser machining method. It is contemplated that a one-dimensional photonic crystal structure may be formed using the laser machining process of the present invention, as well.

Figure 4:
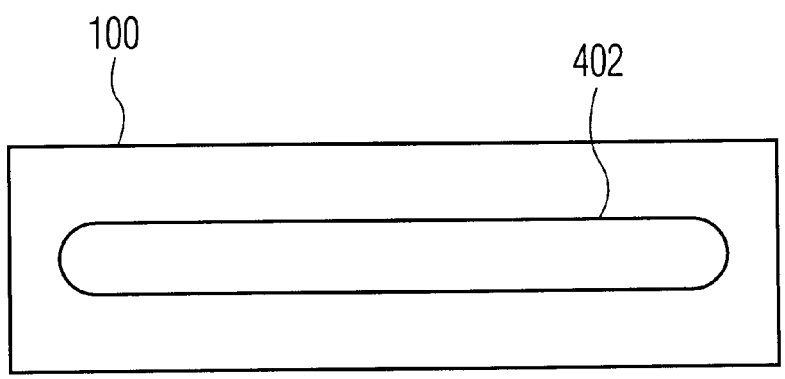
FIG. 4 is a top view drawing illustrating a laser machined groove cut in a section of material using an exemplary laser machining method of the present invention.

FIG. 4 illustrates an additional application of the exemplary laser machining process described above with reference to FIG. 5. The material sample 100 in FIG. 4 has had a groove 402 laser machined into its surface. This groove may be cut according to the present invention by forming a series of sub-wavelength diameter holes having a pitch which is a fraction of a hole diameter, so that the holes overlap forming a substantially smooth groove. To form such a groove, it may be desirable to separate the hole positions into at least three groups.

While the invention has been described in terms of an exemplary embodiment, it is contemplated that it may be practiced as described above within the scope of the appended claims. Also, it will be understood to one skilled in the art that a number of other modifications exist which do not deviate from the scope of the present invention as defined by the appended claims.

What is claimed:

1. A method to drill a plurality of holes in a material using an ultra-fast pulsed laser beam, comprising the steps of:
   a) setting a pulse energy of the laser beam to a first predetermined level, selected to provide an intensity greater than an ablation threshold of the material within a hole-drilling portion of the laser beam;
   b) positioning the material to focus the laser beam on one of a plurality of first positions on a surface of the material;
   c) applying a number of pulses of the laser beam to ablate the surface, thereby forming one of the plurality of holes in the surface;
   d) repeating steps b) and c) until all of the plurality of first positions on the surface have one of the plurality of holes;
   e) setting the pulse energy of the laser beam to a second predetermined level, selected to provide an intensity greater that a laser hardened ablation threshold of the material within the hole-drilling portion of the laser beam;
   f) positioning the material to focus the laser beam on one of at least one second position on the surface, wherein the one second position is between two adjacent ones of the plurality of first positions; and
   g) applying a number of pulses of the laser beam to ablate the surface, thereby forming one of the plurality of holes in the surface.

2. A method according to claim 1 wherein the at least one second position includes a plurality of second positions, each of the plurality of second positions being between two adjacent ones of the plurality of first positions, the method further comprising the steps of:
   h) repeating steps f) and g) until all of the plurality of second position on the surface have one of the plurality of holes;
   i) setting the pulse energy of the laser beam to a third predetermined level, greater than the second predetermined level;
   j) positioning the material to focus the laser beam on one of at least one third position on the surface, wherein the one third position is between one of the plurality of first positions and an adjacent one of the plurality of second positions; and
   k) applying a number of pulses of the laser beam to ablate the surface, thereby forming one of the plurality of holes in the surface.

3. A method according to claim 1, further including the step of operating the laser such that the laser beam oscillates in the $TEM_{0,0}$ mode.

4. A method according to claim 1, wherein the laser beam has a wavelength and the step of setting the pulse energy of the laser beam to the first predetermined level includes the step of setting the pulse energy of the laser beam to define the hole-drilling portion of the laser beam to have a diameter less than the wavelength of the laser beam.

5. A method according to claim 4, wherein the laser beam has a wavelength of 775 nanometers and the step of setting the pulse energy of the laser beam defines the hole-drilling portion of the beam to have a diameter of approximately 500 nm.

6. A method according to claim 1, wherein the step of setting the pulse energy of the laser beam to the second predetermined level includes the step of setting the second predetermined level of pulse energy to a level that is greater than the first predetermined level of the pulse energy.

7. A method according to claim 1, wherein the step of setting the pulse energy of the laser beam to the first predetermined level includes the step of setting the pulse energy to be between 1 nanojoule and 1 microjoule.

8. A method of drilling a plurality of holes in a material using a laser machining apparatus including an ultra-fast pulsed laser and an output coupler through which a laser beam passes, comprising the steps of:
   a. setting a pulse energy of the laser beam to a first predetermined level;
   b. positioning the output coupler to focus the laser beam on one of a plurality of first positions on a surface of the material;
   c. applying a number of pulses of the laser beam to ablate the surface, thereby forming one of the plurality of holes in the surface;
   d. repeating steps b. and c. to position the output coupler at respectively different ones of the first position until a portion of the plurality of holes have been formed at the plurality of first positions;
   e. setting the pulse energy of the laser beam to a second predetermined level;
   f. positioning the output coupler to focus the laser beam on one of at least one second position on the surface, wherein the one of the at least one second position is between two adjacent ones of the plurality of first positions;
   g. applying a number of pulses of the laser beam to ablate the surface, thereby forming one of the plurality of holes in the surface.

9. A method to drill a plurality of holes in a material using an ultra-fast pulsed laser beam, comprising the steps of:
   a) setting a pulse energy of the laser beam to a predetermined level, selected to provide an intensity greater that an ablation threshold of the material within a hole-drilling portion of the laser beam;
   b) positioning the material to focus the laser beam on one of a plurality of first positions on a surface of the material;
   c) applying a first predetermined number of pulses of the laser beam to ablate the surface, thereby forming one of the plurality of holes in the surface;
   d) repeating steps b) and c) until all of the plurality of first positions on the surface have one of the plurality of holes;
   e) positioning the material to focus the laser beam on one of at least one second position on the surface, wherein the one second position is between two adjacent ones of the plurality of first positions; and f) applying a second predetermined number of pulses, greater than the first predetermined number, to ablate the surface, thereby forming one of the plurality of holes in the surface.

10. A method according to claim 9 wherein the at least one second position includes a plurality of second positions, each of the plurality of second positions being between two adjacent ones of the plurality of first positions, the method further comprising the steps of:

g) repeating steps e) and f) until all of the plurality of second position on the surface have one of the plurality of holes;

h) positioning the material to focus the laser beam on one of at least one third position on the surface, wherein the one third position is between one of the plurality of first positions and an adjacent one of the plurality of second positions; and i) applying a third predetermined number of pulses of the laser beam to ablate the surface, the third predetermined number being greater than the second predetermined number, thereby forming one of the plurality of holes in the surface.

11. A method according to claim 9, further including the step of operating the laser such that the laser beam oscillates in the $TEM_{0,0}$ mode.

12. A method according to claim 9, wherein the laser beam has a wavelength and the step of setting the pulse energy of the laser beam to the predetermined level includes the step of setting the pulse energy of the laser beam to define the hole-drilling portion of the laser beam to have a diameter less than the wavelength of the laser beam.

13. A method according to claim 12, wherein the laser beam has a wavelength of 775 nanometers and the step of setting the pulse energy of the laser beam defines the hole-drilling portion of the beam to have a diameter of approximately 500 nm.

14. A method according to claim 9, wherein the step of setting the pulse energy laser beam to the predetermined level includes the step of setting the pulse energy to be between 1 nanojoule and 1 microjoule.

* * * * *